United States Patent Office 3,767,823
Patented Oct. 23, 1973

---

3,767,823
PREPARATION OF TOASTER SANDWICH
Fred G. Wheeler, Park Forest, and Frank J. Pratl, Lisle, Ill., assignors to Armour and Company, Chicago, Ill.
No Drawing. Filed June 24, 1971, Ser. No. 156,564
Int. Cl. A21d 13/00
U.S. Cl. 426—241
9 Claims

ABSTRACT OF THE DISCLOSURE

A sandwich suitable for heating in toasters and for other uses is prepared by encasing a food filling in raw dough, wetting or blanching the product to render it receptive to a dry cereal and adhering a coating of cereal to the dough by a second blanching or aqueous dip, and cooking the product.

BACKGROUND AND SUMMARY

There is a problem in preparing a sandwich for toaster use in that the sandwich should have a crisp texture and the cereal coating which is applied for the crisp texture must be united effectively so that it resists abrasion and protects the sandwich in the handling operations.

We have discovered that the food-filled raw dough may be blanched or wetted to render the dough adhesive and then coating the dough with a dry cereal, such as corn meal, farina, dry hominy grits, etc., and finally anchoring the cereal coating on the sandwich by a second blanching or wetting, and thereafter cooking the coated dough body. Preferably, the food-filled dough body is blanched in hot water and, after draining, is coated with dry cereal particles. The coated body is then blanched a second time in hot water to anchor the coating upon the body so that it may be effectively cooked with the cereal coating in place. Alternatively, the dry cereal particles can be rendered adhesive by precooking, and the precooked cereal after drying is applied to the food-filled dough body which is wetted to receive the coating, and thereafter the coat is anchored in place by a second cold water dip so that the product can then be effectively cooked.

We have found that a further advantage is obtained by dissolving in the second blanch water or cold water a browning improvement agent which aids in adherence of the particles while also improving browning during the subsequent cooking step which may be by deep fat frying or baking in an oven, etc.

DETAILED DESCRIPTION

In the practice of our invention, we encase a suitable food filling, such as meat, egg, cheese or fruit, in a raw dough sandwich body which may consist of flour, salt and water. Shortening can be used and we prefer to have it as a part of the dough formula. By way of example, a typical formula may be:

| | Percent |
|---|---|
| Flour | 64 |
| Lard | 8 |
| Salt | 2½ |
| Water | 25½ |

After the filling is encased in the dough, the resulting raw sandwich is blanched in boiling water for about 1 to 30 seconds. We prefer a blanching of for about 5 to 8 seconds. When the sandwich is removed from the blanching water, it is allowed to drain, after which it is coated with a cereal meal, such as corn meal, farina, or dry hominy grits. The cereal-coated sandwich is then blanched a second time, preferably for about 15 to 30 seconds, the blanching being in boiling water. In both blanching steps, we prefer to have the water at a temperature of about 200–212° F.

While the above two blanching-step process is preferred, it is possible to produce a satisfactory product without using hot water provided the dry cereal is first precooked and then dried and the dried cereal applied to the dough after the dough has been wetted with water. The cereal coating must then be anchored in place by a second water dip so that the coating will remain effectively in place during the cooking step. The water wetting may be by dipping the dough containing the food material in a vessel containing water, or the water may be applied in any other suitable way. The precooked cereal in contact with the wet surface of the dough adhesively clings to the dough body to cover it, and while the coating is uniform, it remains in fragile condition until a second water dip or application of water is made to anchor the coating in place.

After the second blanch or cold water dip, the sandwich may be cooked in any suitable manner, such as by deep fat frying or by oven baking, etc.

We find that the application of the cereal coating followed by the water dip causes a tight adherence of the cereal particles to the sandwich product, and after the cooking operation the product has an attractive surface appearance similar to the surface appearance of pretzels with coarse salt. The improved crisp surface texture renders the product suitable for handling in toasters and for other uses and improves the eating quality of the product.

If desired, the filling which may consist of cheese, sausage pizza, cheese and ham, cheese and salami, cheese and beef, etc. may be enclosed between two thin sheets of dough and crimped around the edge. Further, if desired, the sandwich may be crimped once or twice through the body of the snack sandwich so as to make it possible to break the final product into two or three individual snacks, etc.

While the product may be designed to be heated in a toaster, it may also be heated in an oven or on a grill, etc.

If it is desired to improve the browning characteristics of the sandwich, the second blanch water or the cold water used with the precooked cereal can be modified by the addition of one or more of the following:

Sodium bicarbonate
Monosaccharides
Disaccharides
Milk in any of its commercial forms
Whey in any of its commercial forms.

We prefer to use a second blanch water or cold water dip in which water, sodium bicarbonate and dextrose are added in the following proportions by weight:

| | Parts |
|---|---|
| Water | 48 |
| Sodium bicarbonate | ½ |
| Dextrose | 1 |

Specific examples which are illustrative of the invention may be set out as follows:

EXAMPLE I

A cheese filling was encased between two raw sheets consisting of 64 percent flour, 8 percent lard, 2½ percent salt, and 25½ percent water, and the raw sandwich then blanched in boiling water for about 8 seconds. The sandwich was then removed from the blanching water and allowed to drain for about 10 seconds, after which it was coated with corn meal. The coated sandwich was then blanched a second time for 20 seconds in boiling water and then cooked by deep fat frying at about 370° F. for 1 minute. The resulting product had a crisp, hard surface in which the cereal parts adhered firmly to the surface, very much like coarse salt adheres to pretzels.

EXAMPLE II

The process was carried out as described in Example I except that a filling of cheese and beef was encased between sheets of dough crimped at the edges and the product was blanched in boiling water for about 5 seconds. The sandwich was allowed to drain and then cooked hominy grits was applied over the sandwich to coat the same and the coated product then dipped in cold water to adhere the cereal particles to the sandwich. The product was then baked in an oven at about 550° F. for approximately 10 minutes. The results were substantially as described in Example I.

EXAMPLE III

The process was carried out as described in Example I except that in the second blanching operation the water contained sodium bicarbonate and dextrose in the proportions by weight of about 48 parts water, ½ part sodium bicarbonate, and 1 part dextrose. The sandwich was then cooked by deep fat frying, with the results approximating those described in Example I. The cooked product had a crispy texture, with a hard surface to which the cereal particles adhered as a protective coating.

While in the foregoing specification we have set out specific steps in considerable detail for the purpose of illustrating embodiments of the invention, it will be understood that such details may be varied widely by those skilled in the art without departing from the spirit of our invention.

What is claimed is:

1. In the preparation of a filled sandwich, the steps of encasing a food filling in raw dough, wetting the surface of the dough to render it adherent, applying dry cereal meal to the surface of the dough to coat the same, wetting the coated product to anchor the cereal coating upon the product, and cooking the coated product.

2. The process of claim 1 in which said first mentioned wetting is by hot water.

3. The process of claim 1 in which said cereal meal is precooked and said first mentioned wetting is by hot or cold water.

4. The process of claim 1 in which the second wetting of the dough is in water containing sodium bicarbonate and dextrose.

5. The process of claim 1 in which the water for the second wetting of said product contains browning agents selected from the group consisting of sodium bicarbonate, monosaccharides, disaccharides, milk and whey.

6. In the preparation of a filled sandwich, the steps of encasing a food filling in raw dough, blanching the encased product in water at a temperature of about 200–212° F., to make the surface of the dough sticky, draining the product, applying cereal meal to the surface of the product to coat the same, dipping the coated product in water to adhere said coating particles, and cooking the coated product.

7. The process of claim 6 in which said dipping of the coated product is in hot water to blanch the product a second time.

8. The process of claim 6 in which said cereal particles are precooked and said dipping of the coated product is in cold water.

9. The process of claim 6 in which said product is cooked in deep fat.

References Cited
UNITED STATES PATENTS

| | | | |
|---|---|---|---|
| 1,596,652 | 8/1926 | Giovannetti | 99—86 UX |
| 3,143,424 | 8/1964 | Wilson | 99—87 UX |

RAYMOND N. JONES, Primary Examiner

J. R. HOFFMAN, Assistant Examiner

U.S. Cl. X.R.

426—296, 344, 441, 496, 506